April 6, 1948. E. C. HARTLEY ET AL 2,438,999
AUTOMATIC MEANS FOR CLAMPING AND DEFORMING THE ENDS OF TUBES
Filed Feb. 20, 1945 3 Sheets-Sheet 1

Inventors
Emmett C. Hartley
Henry E. Hull
By Mason, Porter & Diller
Attorneys

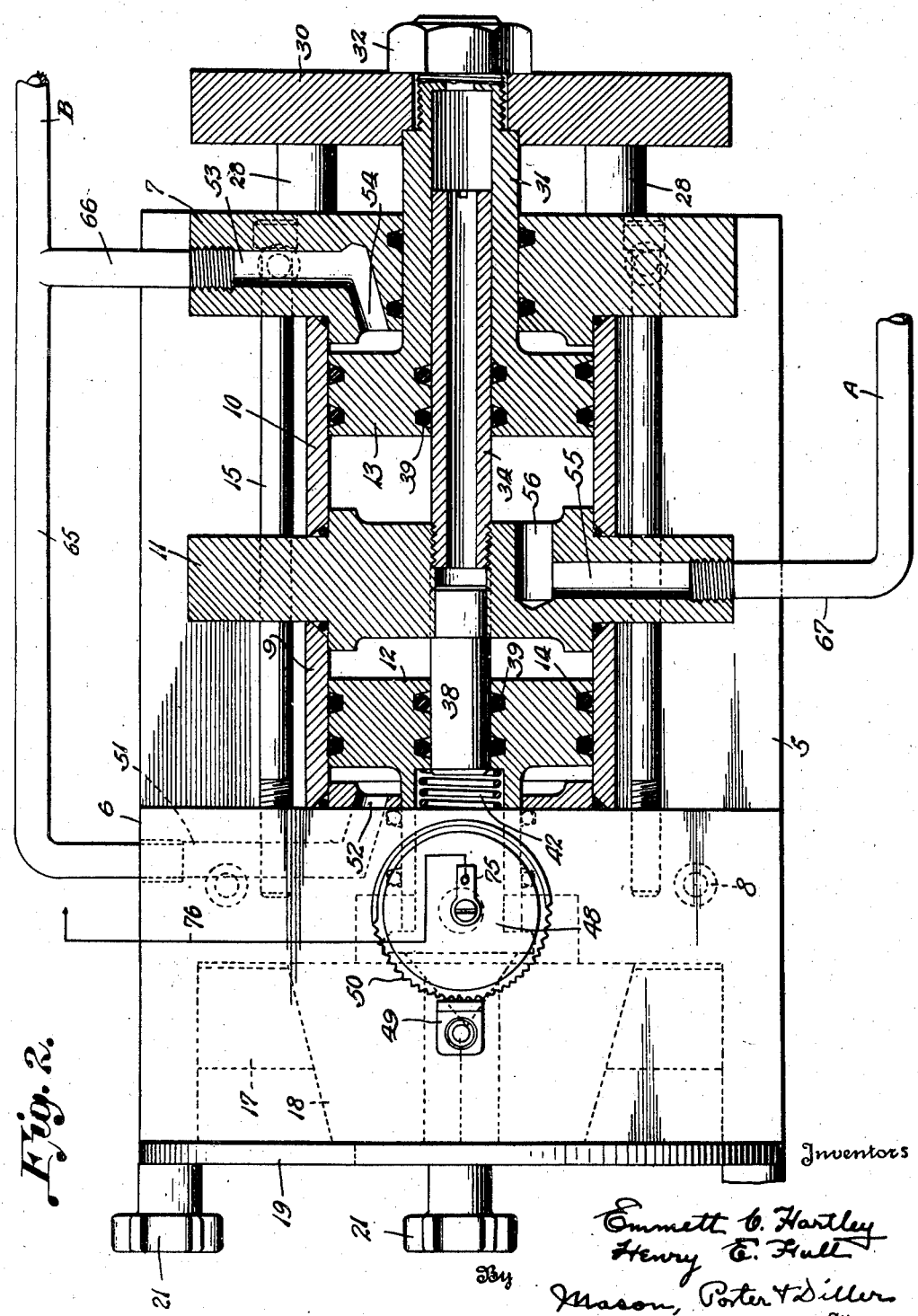

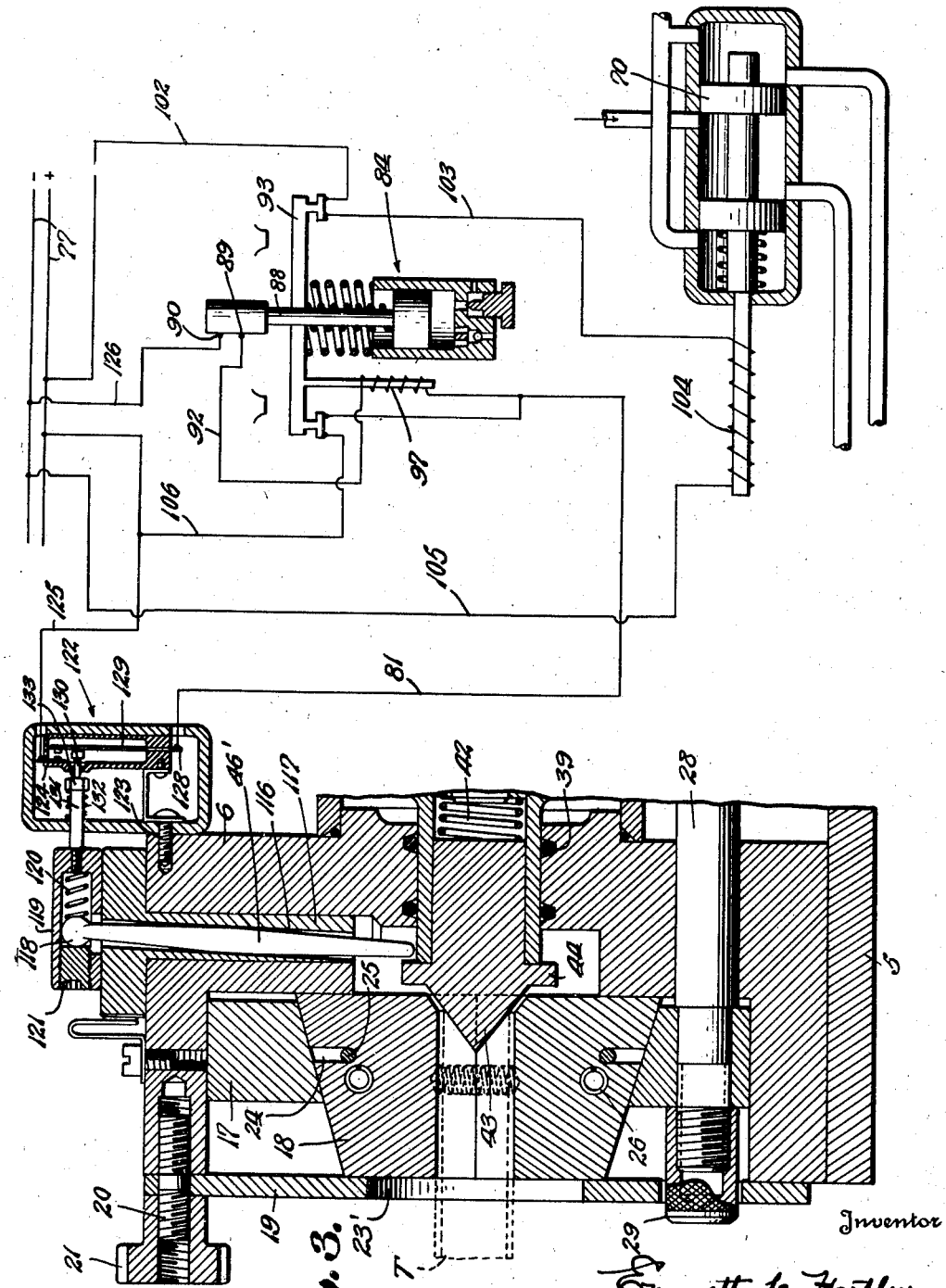

Patented Apr. 6, 1948

2,438,999

UNITED STATES PATENT OFFICE 2,438,999

AUTOMATIC MEANS FOR CLAMPING AND DEFORMING THE ENDS OF TUBES

Emmett C. Hartley and Henry E. Hull, Cleveland, Ohio, assignors to The Parker Appliance Company, Cleveland, Ohio, a corporation of Ohio Application February 20, 1945, Serial No. 578,898

7 Claims. (Cl. 153—79)

The present invention relates to hydraulically operated tube end deforming machines, and more particularly to an automatic means for causing a complete cycle of operation of the machine.

An important object of the invention is to provide a tube end deforming machine having means for positioning and clamping the end of the tube to be deformed, hydraulic means associated therewith for actuating the clamping and deforming means, and means effective upon positioning the tube for automatically starting the machine and causing operation of the hydraulic means.

Another object of the invention is to provide a machine of the above character wherein upon positioning the tube end against the deforming means the machine is automatically started to complete the cycle of clamping the end of the tube, deforming the same and subsequent release of the clamping means.

With the above and other objects in view that will hereinafter appear, the nature of the invention will be more clearly understood by reference to the following detailed description, the claims, and the several views illustrated in the accompanying drawing.

In the drawings:

Figure 2 is a horizontal sectional view, partly in plan, of the machine illustrating the hydraulic circuit for operating the clamping and deforming elements.

Figure 3 is a vertical sectional view of a modified form of the invention.

Figure 1:
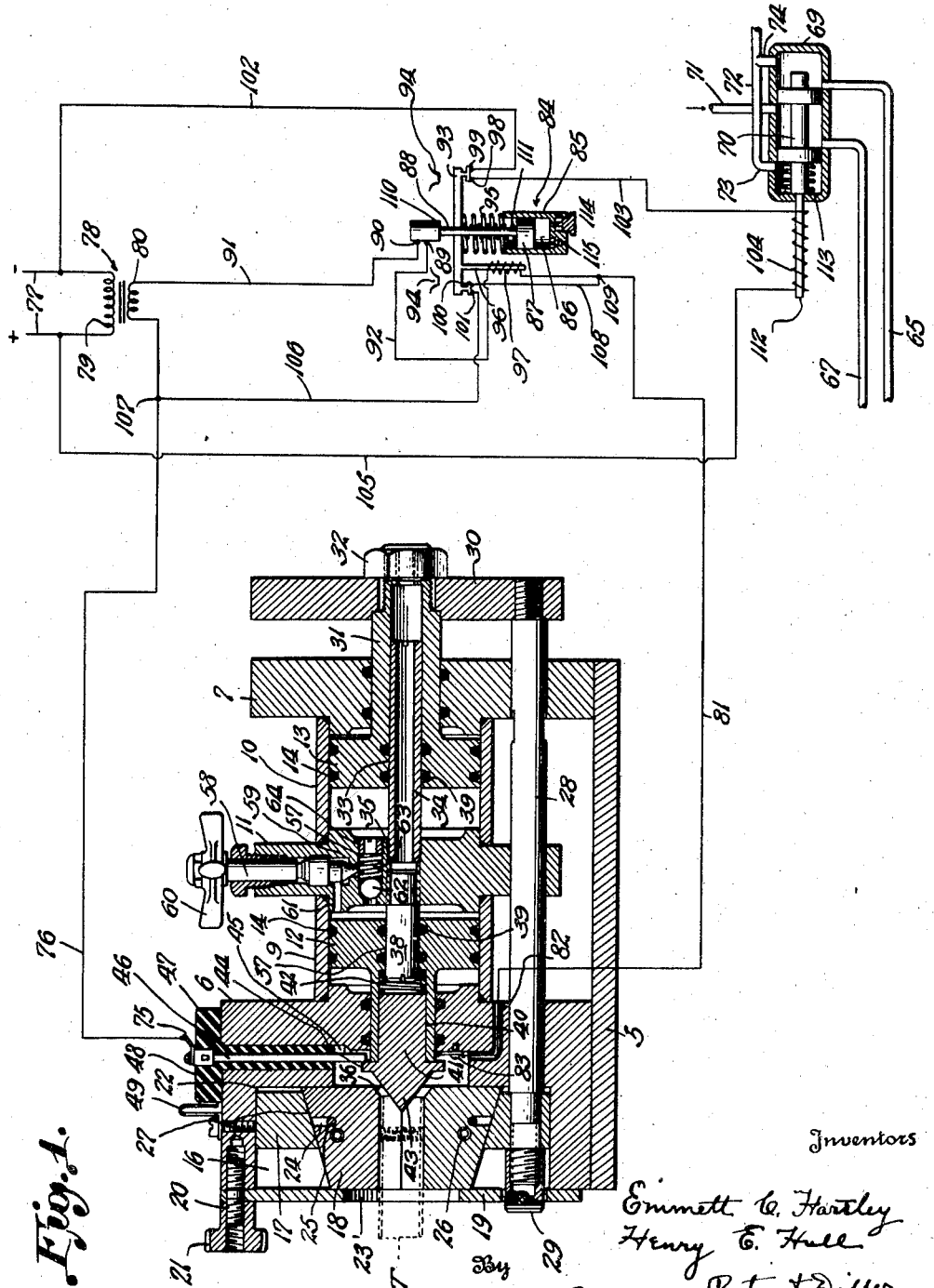
Figure 1 is a vertical sectional view through a tube end deforming machine in which there is schematically shown therewith a wiring diagram of the automatic electric circuit.

In a copending application, Ser. No. 569,751, filed December 26, 1944, there is disclosed a tube end deforming machine which is hydraulically operated for clamping the tube end and deforming the same. In that application, the machine is under the constant attention of the operator in that a valve must be manually operated for starting and stopping the machine. The present application is similar to the copending application and differs therefrom primarily in the electrical means which has been provided for accomplishing automatic operation of the machine shown in said copending application. The parts that are similar to corresponding parts in the copending application have been illustrated and will be hereinafter specifically described in order that a complete understanding will be had of the invention.

Referring to the drawings for a more detailed description thereof, and particularly Figures 1 and 2, the tube end deforming machine comprises a substantially rectangular shaped base plate 5 on which is mounted spaced upright members 6 and 7, said members being located at each end of the base plate and secured thereto by means of bolts or the like 8. Mounted between the uprights 6 and 7 are a pair of cylinders 9 and 10 maintained in spaced relation by the spacer member 11. The cylinder 9 carries a piston 12 and the cylinder 10 carries a piston 13, said pistons being suitably packed by means 14 within their cylinders. The uprights 6 and 7, cylinders 9 and 10 and spacer member 11 are linked together by means of the tie bolts 15, there being preferably provided eight of these tie bolts.

The front upright member 6 is formed with an annular recess 16 at its outer end for receiving a cam ring 17 and chuck 18, the chuck being held against longitudinal movement by the plate 19, while said plate is held in position by the studs 20 and scalloped thumb nuts 21. The recess 16 is of a depth substantially equal to the length of the chuck 18 and thus said chuck is held against longitudinal movement between said plate and the rear wall 22 of the recess 16. The chuck 18 is adapted to grip the tube T as the end of the latter is to be deformed and the plate 19 is provided with a central bore 23' through which the tube is inserted.

The chuck 18 comprises four tapered segmental members, the outer periphery of which is formed with an annular groove 24 in which is positioned a snap ring 25. This snap ring maintains the segments in unitary relation at all times. The chuck further includes coil springs 26 mounted in drilled holes in each segment so that the segments will be urged out of tube gripping engagement for permitting the completed tube to be readily removed and a new one inserted therefor.

The cam ring 17 is also positioned in the recess 16 and is formed with a bore 27 tapering downwardly and outwardly and generally conforming to the shape of the outer periphery of the chuck 18. Thus, when the cam ring has been shifted to the position shown in Figure 1, the chuck segments are actuated radially inward to grip the tube T for the end deforming operation. The cam ring 17 is actuated by the piston 13 and is connected to said piston by means of four draw bolts 28. The forward end of the draw bolts 28 are provided with knurled nuts 29 which extend through apertures in the plate 19 and are held against the ring as shown in Figure 1. The other end of the draw bolts 28 screw-threadedly engage a plate 30, which plate is mounted on the end of a rod 31 that is integral with and forms a part of the piston 13. The plate 30 is held on the rod 31 by means of a lock nut 32.

The piston 13 is formed with a central bore 33 throughout its length and mounted within said bore is a guide sleeve 34 whose end 35 screw-threadedly engages the spacer member 11. Thus, it will be seen that as the piston 13 moves toward the right or left as viewed in Figure 1, it will be guided on the sleeve 34 and will carry with it the plate 30 draw bolts 28, and cam ring 17 since these parts are all interconnected. Movement of the cam ring 17 to the left as viewed in Figure 1 releases the chuck 18 so that the tube T can be released and a new tube inserted.

The piston 12 is movable toward the left as viewed in Figure 1 for deforming the end 36 of the tube T. This piston is formed with a central bore 37 in which is received a shaft 38 carried by the spacer member 11 which shaft guides the piston in its movement. The pistons 12 and 13 are sealed on the shaft 38 and sleeve 34 respectively with suitable packing 39. The end 40 of the piston 12 is hollow and projects through the front upright member 6. This end supports a flaring element 41 backed at one end by a tension spring 42, its other end being cone-shaped as indicated at 43 for flaring the tube end 36. The flaring element 41 is provided with an annular flange 44 that is normally positioned within a counterbore 45 in the upright member 6 and forms an abutment shoulder for the piston end 40. This annular flange is also engageable with a pin 46 disposed in the counterbore 45 for properly locating the end of the tube with respect to the chuck 14. The pin 46, for reasons to hereinafter appear, is eccentrically mounted in an insulating member 47 so that when said member is rotated through its enlarged end 48, the pin moves forward and backward as desired with respect to the chuck 18. The member 47 is yieldably held in any set position by a spring member 49 which engages notches 50 in the face of the enlarged end 48. As shown in Figure 2 of the drawing, only 180° of the face of the enlarged end 48 is notched since obviously 180° turning of the sleeve will shift the pin 46 from its rearmost to its foremost position. After the tube has been positioned and locked within the chuck 18, movement of the piston 12 to the left will cause the end 40 thereof to engage the annular flange 44 for forcing the conical end 43 of the flaring element into the tube for flaring the end.

The pistons 12 and 13 are hydraulically operated in their cylinders 9 and 10 for actuating the flaring element 41 and the cam ring 17 respectively, one means of supplying and exhausting fluid to and from the cylinders is shown in Figure 2. The upright 6 is formed with a fluid passage 51 terminating at 52 within the cylinder 9 and communicating with the left hand side of the piston 12. Likewise, upright 7 has a fluid passage 53 therein terminating at 54 and communicating with the right hand side of the piston 13. The spacer member 11 has a passage 55 terminating at 56 and communicating with a left hand side of piston 13. The spacer member 7 is further formed with a passage 57, see Figure 1, to afford communication between the cylinders 9 and 10. Mounted substantially centrally of the spacer 11 and projecting beyond the end thereof, there is a needle valve 58, the lower end of which is movable in an aperture 59 communicating with the passage 57. The stem of the valve 58 is provided with a handle 60 for rotation of the valve when desired to adjust the passage of fluid through the aperture 59. The aperture 59 communicates with a horizontal passage 61 leading into the cylinder 9. The passage 57 has a ball check valve 62 mounted therein which is backed by a spring 63 removably held in said passage by the lock ring 64. As will hereinafter appear, the check valve 62 prevents passage of the fluid directly into the cylinder 9 from the cylinder 10.

In accordance with the present invention, an electrical means has been provided for automatically actuating a reversing valve to supply fluid under pressure to operate the pistons 12 and 13. First, however, a conduit 65 is connected to the passage 51 and is also connected to the passage 53 through a branch conduit 66. A second conduit 67 is connected to the passage 55. The conduits 65 and 67 terminate in a housing 69, shown in Figure 1 of the drawings, which housing supports a spool valve 70. The housing 69 is supplied with fluid under pressure through the conduit 71, while a conduit 72 connects with a reservoir for returning the fluid thereto through the outlet connections 73 and 74 under the control of the spool valve 70.

As shown in Figure 1 of the drawings, the pin 46 is suitably insulated through the member 47 and the upper end of said pin carries a contact element 75 to which one end of a wire 76 is attached. Current is supplied from a suitable source through a line 77 which is coupled with a transformer generally designated by the reference numeral 78 having a primary and secondary winding 79 and 80, respectively. The machine forms a grounding contact for the current passing through the transformer 78 and line 81, the latter being guided through a tubular insulating member 82 prior to its connection with the upright member 6 as indicated at 83. Interposed within the system there is a holding relay generally designated by the reference numeral 84 which includes a dash pot 85 providing a cylinder 86 in which is supported a piston 87 carried on a contact rod 88. The upper end of the rod 88 is adapted to close the contacts 89 and 90. The secondary winding 80 of the transformer is connected to the contact 90 through the wire 91 and the contact 89 is connected to a wire 92.

The holding relay further includes a vertically movable contact bar 93. Stops 94 are provided against which the contact bar 93 is held by means of the spring 95 when the electric circuit is open. It will be noted that the spring 95 is interposed between the lower face of the contact bar 93 and the upper end of the dash pot 85 and the tension of the spring is ordinarily sufficient to urge the contact bar upwardly against the stops 94 when the circuit is open. A shaft or the like 96 extends downwardly from the contact bar 93 on which is supported a coil 97, said coil forming a part of the lines 92, 81 and adapted when energized to pull the contact bar 93 downwardly from its stops 94 against the tension of the spring 95. The contacts 98, 99, 100 and 101 are adapted to be engaged by the contact bar 93 upon downward movement thereof. The contact 99 is connected to one side of the power line 77 through the wire 102 and the contact 98 has a wire 103 leading therefrom to a solenoid 104, from which extends a wire 105 leading to and connecting with the other side of the power line 77. Contact 101 has a wire 106 leading therefrom which is connected to the line 76 and the secondary winding 80 of the transformer as indicated at 107 and the contact 100 is associated with a wire 108 which is connected with the line 81 as indicated at 109. When a circuit is completed through contact 101, line 106, secondary winding 80, line 91, contact 89 and 90, line 92, coil 97, line 108 to contact 100, the coil 97 will remain energized even though the initial circuit is broken. As long as the coil is energized, the solenoid will remain energized and thereby hold the reversing valve 70 in its operating position. Thus, this circuit through the contacts 100 and 101 becomes a part of the holding relay, the purpose of which will be hereinafter more fully described.

When the machine is not in use, the chucks 18 are opened and the annular flange 44 of the flaring cone 43 is out of contact with the pin 46. In this position the electric circuit is open so that the spring 95 will maintain the contact bar 93 of the holding relay against the stops 94. The contact bar 93 will also engage the shoulder 110 formed on the rod 88 so that the lighter spring 111 will not force the rod 88 and its piston 87 downwardly within the dashpot cylinder 86. The solenoid 104 is mounted on a shaft 112 which is carried by and forms a part of the spool valve 70 and being deenergized will permit the spring 113 to urge the spool valve to an extreme right position whereby fluid pressure passing through the conduit 65 will maintain the pistons 12 and 13 in abutting relation with the spacer member 11. With the pistons 12 and 13 so held, it is readily apparent that the cam ring 17 is out of operative engagement with the chuck 18, and that the end 40 of the piston 12 is out of operative engagement with the flaring cone 43.

When desiring to flare the end of the tube T, the tube is first inserted through the opening 23' of the plate 19 and into the jaws of the clutch 18 until its end is brought into engagement with the flaring cone 13. Pressure on the tube and flaring cone 43 will move the latter rearwardly against the tension of the spring 42 until the annular flange 45 contacts the pin 46. Contact of the flange 45 with the pin 46 establishes an electric circuit through the line 76, secondary winding 80 of the transformer 78, through the contacts 89 and 90, through the line 92, coil 97 and line 81 to the frame of the machine at 83. This circuit will energize the coil 97 and through its relation with the contact bar 93 will urge said contact bar downwardly bridging the contacts 98, 99, 100 and 101. A circuit is then completed from the power line 77 through contacts 98 and 99 and line 103 to energize the solenoid 104. When this solenoid is energized, it pulls the spool valve 70 toward the left to the position shown, compressing the spring 113 and directing fluid through conduit 67. The conduit 67 being connected to the cylinder 10 through the port 56 will cause the fluid to be directed therein for moving the piston 13 from its position adjacent the center upright 11 toward the right to close the chuck 18 around the tube end through the cam ring 17. As before indicated, the piston 13 is operatively connected with the cam ring 17 through the plate 30 and draw bolts 28. Thus all of these elements operate in unison upon fluid being admitted to the cylinder 10.

After the tube has been clamped through the chuck 18, pressure will build up in the cylinder 10 and flow through the passage 57, valve controlled passage 59 and horizontal passage 61 into the cylinder 9. Fluid pressure entering the cylinder 9 will actuate the piston 12 toward the left bringing its end 40 into engagement with the annular flange 44 of the flaring tool 41 to deform the tube end. Fluid from each cylinder 9 and 10 is exhausted through conduits 65, into the housing 69 and returned to the reservoir through the conduit 74. As soon as the flaring cone flange 44 moves away from the pin 46, the circuit which initiated the cycle is broken and the holding relay 84 will function to maintain a closed circuit until the flaring operation has been completed. As before indicated, when the coil 97 is energized, the contact bar 93 is pulled downward bridging the contacts 98 and 99. At the same time, however, said bar bridges the contacts 100 and 101 whereby the coil 97 remains energized by current passing through line 106, the secondary winding 80, through contacts 89 and 90, line 92 and 108 as previously described. As soon as the contact bar 93 has moved downwardly freeing the same from the shoulder 110, the light spring 111, active on the piston 87, starts to pull the contact rod 88 downwardly. However, such downward movement of the contact rod is momentarily delayed by the dashpot 85 so that the flaring cone 43 can completely flare the tube end. Continued downward movement of the contact rod 88 under the influence of the spring 111 will move the end of said rod out of engagement with the contacts 89 and 90 to open the circuit. The time which is required for the contact rod to open the circuit at the contacts 89 and 90 is adjustable by means of a needle valve 114.

As soon as the contact rod 88 opens the contacts 89 and 90, the coil 97 will be deenergized allowing the spring 95 to force the contact bar 93 upwardly to break contacts 98, 99, 100 and 101. Breaking of the contacts 98 and 99 will deenergize solenoid 104 whereupon the spring 113 will urge the spool valve 70 toward the extreme right position to reverse the fluid pressure, and cause release of the tube clamping chuck and withdrawal of the flaring cone actuating piston. It is to be understood that as the pressure fluid is reversed it will be exhausted from the cylinder 10 through the port 56 and conduit 67 and returned to the housing 69 from where it passes to the reservoir through the conduit 73. Of course, the valve is then so positioned in the housing 69 that the conduits 67 and 73 are in communication. At the same time fluid from within the cylinder 9 will force the ball check valve 62 away from its seat permitting the fluid to enter the cylinder 10 and likewise be exhausted through the port 56 and conduit 67. The pistons will then have been returned to their initial position adjacent the spacer member 11 and the machine and electric circuit is then ready for flaring another tube.

It will be noted that there has been provided a check valve 115 in the dashpot 85 to assure quick upward movement of the contact rod 88 so that the operator need not wait after he moves the completed tube before inserting another tube and starting the next cycle.

From the above description, when taken in connection with Figures 1 and 2 of the drawings, it will be apparent that all the operator has to do in order to flare the end of a tube is to position the tube end against the flaring cone and urge the cone rearwardly against the pin 46 to start the complete cycle of clamping, flaring and unclamping. The transformer has been used to reduce the voltage from the line 77 in order to avoid shocking the operator of the machine. This transformer is necessary since the current passes through the machine from the pin connection 75 to the ground connection 83 and should current be present in the machine there would be the danger of shocking the operator holding the metal tube.

In Figure 3 of the drawings there is shown a modified form of the invention, which includes the use of a micro-switch to establish the circuit and initiate the cycle. In this form of the invention the current does not pass through the machine, as in the preferred form, and consequently the use of a transformer is not required to reduce the voltage. The machine shown in Figure 3 is identical with the preferred form and differs only in the construction of the pin 46' which is contacted by the annular flange 44 when positioning the tube in the manner previously described.

The pin 46' is of a larger diameter in the center than at its ends and is disposed in an angularly drilled passage 116 formed in the member 117. The upper end 118 of the pin 46' is ball shaped and is retained in an adjustable socket 119. This socket 119 is capable of limited horizontal movement under the action of the pin 46', the ball shaped end 118 being supported between the coil spring 120 and screw plug 121. The screw plug 121 is provided for adjusting the spring 120 through the ball shaped end 118.

A micro-switch of conventional construction and generally designated by the reference numeral 122 is fixedly secured to the front upright member 6 as indicated at 123. The micro-switch includes a control element 124 to which is connected a wire 125 leading to one side of the power line 77. A wire 126 leads from the other side of the power line 77 and is connected to the contact 90. As in the preferred form, the contact 89 is connected to the wire 92, coil 97 and wire 81, the wire 81 in the circuit being connected to the contact 128 of the switch element 129. Thus when the switch element 129 is in engagement with the contact 124, a circuit is completed through wire 126, contacts 89 and 90 bridged by contact rod 88, wire 92 switch element 129, and wire 125. The switch element 129 is normally maintained open through the button 130 and stud 131. The stud 131 extends laterally from the socket 119 into the micro-switch 122. A spring 132 is interposed between the head 133 of the stud and the wall of the switch for normally urging said stud toward the button 130. The button is movable laterally through engagement of the stud 131 to maintain the switch element 129 disengaged.

With the contact element in the position shown in Figure 3 of the drawing, the circuit is open and the machine is ready for flaring a tube end. The operation of the electrical circuit for completing the cycle is the same as in the preferred form. In other words, when the circuit is closed, the contact bar 93 is lowered and the coil 97 and solenoid 104 are energized to actuate the spool valve 70 directing fluid under pressure to the cylinders and pistons. The means of initiating the cycle is slightly different, and provision of the micro-switch eliminates the passage of current through the machine. As the tube T is positioned against the flaring cone 43 and urged rearwardly until contact is made between the pin 46' and the annular flange 44, the pin 46' will rock about its bulged center and pull the socket 119 toward the left thereby disengaging the stud 131 from the button 130 and allowing the switch element 129 to close. Closing of the switch element 129 establishes a circuit through the line 125, contacts 89 and 90, coil 97 and line 92. The tube is clamped by the chuck 18 in the manner previously described and when the flaring cone 43 starts to move toward the left under the action of the piston 12, the spring 132 will shift the stud 131 and socket 119 toward the right, the stud 131 again contacting the button 130 to open this part of the circuit in the same manner as described in connection with the preferred form. The holding relay 84 will maintain the coil 97 and solenoid 104 energized until the flaring operation has been completed even though the initial circuit has been opened. As soon as the flaring operation has been completed, the dashpot moves to break the circuit and thereby deenergize the coil 97 and solenoid 104 for reversing the direction of the fluid pressure to release the tube clamping chucks and withdraw the flaring cone actuating piston in the manner previously described.

In each form of the invention pressure of the tube against the flaring cone will cause the latter to contact a pin to start the cycle. After the circuit has been closed, the entire operation of clamping, flaring and unclamping the tube is automatic and is performed through the electrical mechanism and dashpot hereinabove described.

While one form of the invention has been shown for purposes of illustration, it is to be clearly understood that various changes in the details of construction and arrangement of parts may be made without departing from the spirit and scope of the invention as defined in the claims.

We claim:

1. In a tube end deforming machine, the combination of a supporting base, front and rear upright members attached to said base, tube end clamping means associated with one of said upright members, axially movable tube end deforming means movable in one of said upright members, said deforming means adapted to be moved in one direction when positioning the tube and to be moved in the opposite direction during the deforming operation, an electrical circuit closed by said deforming means when moved in said one direction to initiate a cycle to actuate the clamping means and subsequently move the deforming means in the said opposite direction, a holding relay for maintaining the deforming means in operative engagement for deforming the tube after the initial circuit has been opened, and time controlled means for breaking the holding relay to release the clamping and deforming means.

2. In a tube end deforming machine, the combination of a supporting base, front and rear upright members attached to said base, tube end clamping means associated with one of said upright members, axially movable tube end deforming means movable in one of said upright members, said deforming means adapted to be moved in one direction when positioning the tube and to be moved in the opposite direction during the deforming operation, an electrical circuit closed by said deforming means when moved in said one direction to initiate a cycle to actuate the clamping means and subsequently move the deforming means in the said opposite direction, a holding relay for maintaining the deforming means in operative engagement for deforming the tube after the initial circuit has been opened, said holding relay including a contact bar and two pairs of contact elements, a coil adapted to be energized by said electrical circuit for urging said contact bar into engagement with said two pair of contacts, means operative upon closing one pair of contacts to actuate the clamping means and subsequently move the deforming means in the said opposite direction to deform the tube end and open the initial electrical circuit, the other pair of contacts maintaining the coil energized to complete the deforming operation, and dashpot means for opening said contact bar to release the clamping and deforming means.

3. In a tube end deforming machine, the combination of a supporting base, front and rear upright members attached to said base, tube end clamping means associated with said front upright member, tube end deforming means movable in said front upright member, a pair of cylinders positioned between said upright members, pistons operable in each of said cylinders, said pistons adapted to be operated by fluid under pressure entering said cylinders for first clamping the tube end and then deforming said tube end by said deforming means, and an electrically controlled valve operative upon positioning the tube for controlling the admission of fluid under pressure to said cylinders to actuate the clamping and deforming means and the subsequent automatic release of the clamping and deforming means.

4. In a tube end deforming machine, the combination of a supporting base, front and rear upright members attached to said base, tube end clamping means associated with one of said upright members, axially movable tube end deforming means, a vertically disposed pin mounted in said front upright member adapted to be contacted by said deforming means for properly locating said tube end relative to said clamping means, an electrical circuit closed by contact of said deforming means with said pin to initiate a cycle to actuate the clamping means and subsequently actuate the deforming means out of contact with said pin, electrical means for maintaining the deforming means in operative engagement with the tube after the electrical circuit has been opened by movement of said deforming means out of contact with said pin, and dashpot means for releasing the clamping and deforming means.

5. In a tube end deforming machine, the combination of a supporting base, front and rear upright members attached to said base, tube end clamping means associated with one of said upright members, axially movable tube end deforming means, a pin vertically mounted in said front upright member, the lower end of said pin adapted to be contacted by said deforming means for properly locating said tube end relative to said clamping means, a movable socket carried by said front upright member, the upper end of said pin engageable in said movable socket, a normally open switch element associated with said socket, said switch element forming a part of an electrical circuit, said pin being rockable in its support whereby contact of the lower end thereof by said deforming means upon positioning a tube will allow said switch to close thereby initiating a cycle to actuate the clamping means and deforming means and the subsequent release of the clamping and deforming means.

6. In a tube deforming machine, the combination of a tube clamping means, a tube end deforming device, means for supporting and operating said device, said device being initially yieldingly projected away from said operating means to a limited extent, and means actuated by said deforming device when pressed upon by the tube and moved toward said operating means for initiating the clamping means, said clamping means operating to initiate the deforming means when the tube has been clamped therein.

7. In a tube deforming machine, the combination of a tube clamping means, a tube end deforming device, means for supporting and operating said device, said device being initially yieldingly projected away from said operating means to a limited extent, and means actuated by said deforming device when pressed upon by the tube and moved toward said operating means for initiating the clamping means, said clamping means operating to initiate the deforming means when the tube has been clamped therein, and automatic means for releasing the clamping means after a pre-determined time period.

EMMETT C. HARTLEY.
HENRY E. HULL.

REFERENCES CITED

The following references are of record in the file of this patent:

UNITED STATES PATENTS

| Number | Name | Date |
|---|---|---|
| 989,805 | Reynolds | Apr. 18, 1911 |
| 1,943,089 | Rosenberg | Jan. 9, 1934 |
| 2,176,188 | Poole et al. | Oct. 17, 1939 |
| 2,326,541 | Kuehn | Aug. 10, 1943 |
| 2,394,841 | Bugg | Feb. 12, 1946 |